United States Patent Office 3,826,786
Patented July 30, 1974

3,826,786
POLYMERIZATION CONTROLLED DIALLYLIC PHTHALATE POLYMER COMPOSITIONS
Carl Leonard Wright, Pasadena, and Harry Hoyt Beacham, Severna Park, Md., assignors to FMC Corporation, New York, N.Y.
Continuation-in-part of abandoned application Ser. No. 101,004, Dec. 23, 1970. This application May 26, 1972, Ser. No. 257,439
Int. Cl. C08f 3/58
U.S. Cl. 260—78.4 UA        4 Claims

ABSTRACT OF THE DISCLOSURE

Diallylic phthalate prepolymer compositions whose polymerization is controlled, and which compositions may contain polyphenylene ether polymers, are prepared by incorporating in the compositions 0.01 to 1.5% by weight of anthracene, based on the total polymerizable materials.

CROSS-REFERENCE TO RELATED APPLICATIONS

Figure 1:
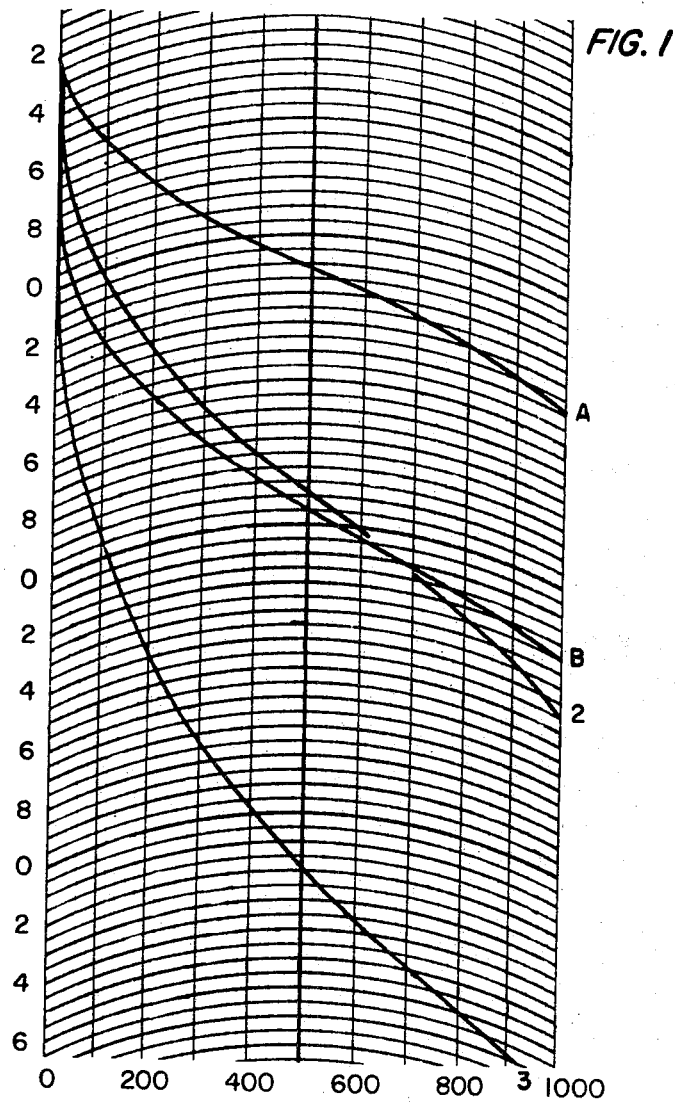

This application is related to copending application U.S. Ser. No. 31,407, filed Apr. 23, 1970, now U.S. Pat. 3,637,578, issued Jan. 25, 1972, and is a continuation-in-part of U.S. Ser. No. 101,004 filed Dec. 23, 1970, now abandoned.

This invention relates to thermosetting diallylic phthalate compositions whose polymerization during thermosetting is controlled.

Thermosetting compositions derived from diallylic phthalate prepolymers are described in U.S. Pat. 3,579,484. These are well known to provide excellent electrical and mechanical properties in molded articles. Control of polymerization during processing of diallylic prepolymers into thermosetting compositions is often difficult and results in undesirable variations in flow and reactivity of the thermosetting composition or molding compound.

Improved thermosetting resin compositions made by combining polyphenylene ether polymers with diallylic phthalate monomers and prepolymers, which in the presence of a suitable catalyst and heat, can be formed under moderate pressure into molded and laminated articles, are disclosed in our copending U.S. Patent application Ser. No. 682,326 filed Nov. 13, 1967. A particularly valuable aspect of these thermosetting compositions is their use in reinforced laminates of fibrous materials such as glass cloth, glass mats, synthetic fibers, and cloth mats which can be copper clad as these compositions adhere well to copper.

These copper-clad laminates are highly useful in making printed circuit boards for use by the electronics industry. The copper-clad laminates are generally prepared by impregnating a suitable reinforcing material, such as glass cloth, with a dispersion in solvent of the catalyzed diallylic phthalate-polyphenylene ether polymer resin composition, drying the impregnated glass cloth and laminating the dry, impregnated glass cloth under moderate heat and pressure to a suitable copper sheet or piece of copper foil. Unfortunately, when the impregnated glass cloth is dried in continuous drying towers at temperatures in excess of 175 to 200° C., with hot air, the activity of the resin system is greatly increased. While not being held to any particular theory regarding the increased activity of the resin, it is believed that exposure of allylic polymers to hot air forms peroxides, in situ; these peroxides favor allyl homopolymerization rather than the desired co-reaction of allyls with the polyphenylene ether. It is theorized that the peroxides so formed have less than a ten hour half-life in benzene at a temperature of 110° C., and that such a peroxide activity is believed required in promoting the co-reaction. In any event, after being dried in hot air the impregnated glass cloth does not produce acceptable lamintes, due to failure of the resin system to flow adequately. The result of poor flow of the resin system during lamination is seen in incompletely formed laminates which generally contain voids. The quality of these laminates is often so poor it is impossible to determine their electrical and physical properties with accuracy.

Antioxidants, such as hydroquinone, a known antioxidant and allylic polymerization inhibitor, when added to catalyzed diallylic phthalate-polyphenylene ether polymer compositions apparently prevents the in situ peroxide formation during continuous hot air drying but unfortunately the inhibition effect on the polymerization is only an induction effect and provides no control over the cure rate once the inhibitor has been consumed. Such control is required in lamination to avoid excessive stress due to rapid release of thermal energy during cure.

In accordance with the present invention there are provided thermosetting resin compositions derived from (a) a diallylic phthalate selected from the group consisting of diallylic phthalate monomers and prepolymers; (b) a free radical catalyst in sufficient amount to convert the diallylic phthalate to the thermoset state at elevated temperatures; and (c) 0.01–1.5% of anthracene by weight based on the resin composition, are compositions which can be used to provide improved control of polymerization in the processing of such compositions to produce thermosetting molding compounds.

In accordance with the present invention there are further provided thermosetting resin compositions (a) 5 to 95% by weight of a diallylic phthalate selected from the group consisting of diallylic phthalate monomers and prepolymers, at least 5 of the 5 to 95% being a liquid monomer; (b) 5 to 95% by weight of a polyphenylene ether having a repeating structural unit of the formula:

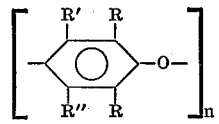

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary $\alpha$-carbon atoms, halohydrocarbon radicals having at least two carbon atoms between the halogen atom and the phenol nucleus and being free of a tertiary $\alpha$-carbon atom, hydrocarbonoxy radicals being free of a tertiary $\alpha$-carbon atom, and halohydrocarbonoxy carbon atoms having at least two carbon atoms between the halogen atom and phenol nucleus and being free of tertiary $\alpha$-carbon atoms, R' and R" are both monovalent substituents which are the same as R and in addition, halogen; (c) a free radical catalyst in sufficient amount to convert the polymerizable material-polyphenylene ether mixture to the thermoset state at elevated temperatures; and (d) 0.1 to 1.5% of anthracene by weight based on the total resin composition, are compositions which can be dissolved in a suitable solvent and used to impregnate reinforcing materials, such as glass cloth, and that the so impregnated material can be continuously dried to remove the solvent at temperatures of 200 to 350° F. depending on exposure time, without increasing the activity of the resin system.

The effect of anthracene in these compositions is quantitative in regulating, that is, retarding, polymerization. Unlike inhibitors, which inhibit cure during an incubation or induction period after which period the polymerization proceeds at the same polymerization rate as uninhibited resins, anthracene alters the rate of polymerization; there is no inhibition and no induction period, but the polymerization rate is retarded.

The diallylic phthalate prepolymers, diallyl orthophthalate and diallyl isophthalate, used in this invention are generally manufactured in a conventional fashion by polymerizing a monomeric material to produce a solution of the soluble prepolymer in monomer, to a point short of gelation wihch occurs when the molecular weight of the prepolymer reaches a point where it becomes insoluble in the monomer. These prepolymer-monomer solutions (called "dopes") are then separated into a solvent-soluble prepolymer fraction, and monomer. This may be accomplished by treatment with a solvent which dissolves the monomer while precipitating the prepolymer, or by other means which leave a soluble prepolymer substantially free of monomer. A typical method of separating such polymers is described by Willard in U.S. Pat. 3,030,-341, issued Apr. 17, 1962. These prepolymers are solids containing little or no monomer; they can be stored indefinitely in this form, since they require a catalyst and either heat or actinic light to convert them to the insoluble stage. Another method of producing diallylic phthalate prepolymer is to:

Polymerize the diallyl phthalate under conditions which leave no significant amount of catalyst residue in the polymerization dope. This is done either (a) by using a diallyl phthalate which will polymerize in the absence of catalyst at 200° C. under nitrogen at a rate indicated by an increase of refractive index $N_D$ of at least about 0.000012 per minute, and either thermally polymerizing without catalyst, or using catalyst in such small quantity that it is substantially destroyed before the end of the polymerization, or (b) by catalyzing by the continuous introduction of a catalyst with a low half-life at the polymerization temperature during the early part of the polymerization and finishing the polymerization thermally; and distill the dope continuously under high vacuum in a still of short residence time, in which the dope is spread as a thin film in order to insure rapid heat transfer and high evaporative surface, at an elevated temperature such that the viscous residue will flow from the still.

Anthracene can be used in amounts up to its solubility limit in the resin compositions. Generally 0.01 to 1.5% by weight based on the total resin composition is effective in regulating allyl polymerization and at this level it is generally soluble in the allylic compositions. Where an induction period as well as polymerization regulation is desired anthracene can be used with known allylic polymerization inhibitors such as hydroquinone. For example, 0.3% anthracene with 100 p.p.m. hydroquinone improves the flow of the compositions by retarding the polymerization rate while the hydroquinone delays the onset of polymerization.

The novel compositions of this invention employ a free radical catalyst in sufficient amount to convert the polymerizable resin or resin-polyphenylene ether mixture to the thermoset state upon the application of heat. Conventionally, peroxide catalysts are used in amounts of about 1 to 10% and preferably 2 to 3%, by weight, based on the total weight of the resin. We have found that catalysts which have a ten hour half-life in benzene at a temperature in excess of 105° C. should be used to some extent to catalyze the compositions of this invention, especially those which contain polyphenylene polymers. Mixed catalysts may be used, but at least part of the catalyst must be such a catalyst having a ten hour half-life at a temperature in excess of at least 105° C. in benzene. We have successfully used dicumyl peroxide, tertiary butyl perbenzoate and 2,5-dimethyl-2,5-di(tert-butylperoxy)hexyne-3 alone or in combination with benzoyl peroxide. We have found that dicumyl peroxide gives the best results in laminates and tertiary butyl perbenzoate the best results in molding compositions. In any event, the catalysts well known in the art to promote the cure of allylic compositions are generally useful in practicing this invention.

The compositions of this invention are useful in molding compounds, which may be of the pre-mixed, powdered, granular or dough type. The molding compositions are prepared in conventional equipment well known in the plastics industry to be useful in compounding diallyl phthalate, epoxy and polyester molding compounds. The molding compositions may be filled or unfilled. The polymerizable monomer and/or prepolymer, along with polyphenylene ether, if used, free radical catalyst, internal mold release, pigment, inhibitor, etc. are simply mixed together in a heavy-duty mixer. The mixing may be done with or without the use of solvents. However, if solvents are used they should be removed from the premixed compound before molding.

The molding compositions can be molded under conditions normally used for allylic molding compositions, i.e., they are molded at from about 130° to 180° C. for about 1 to 60 minutes. Because of the varied viscosities of these novel molding compositions the molding pressure can vary from about zero (0) to 10,000 p.s.i.

A wide variety of water-insoluble, inert inorganic fillers may be used in these molding compositions. Fillers which can be used in practicing this invention include calcium carbonate, both precipitated and wet ground types, calcium silicate, ground silica, calcined clays, chalk, limestone, calcium sulfate (anhydrous), barium sulfate, asbestos, glass (powdered), quartz, aluminum trihydride, aluminum oxide, antimony oxide, inert iron oxides, and ground stone such as granite, vasalt, marble, limestone, sandstone, phosphate rock, travertine, onyx and bauxite. Additionally, inert fibrous materials may be used such as synthetic fibers, glass fibers, asbestos and cellulosic fibers. Up to 200 parts by weight of filler and/or fiber per 100 parts by weight of diallylic phthalate-polyphenylene ether resin may be used in these molding compositions.

The novel resin compositions of this invention are readily used in preparing glass reinforced laminates by either wet lay-up or prepreg techniques.

The novel resin compositions of this invention can be employed in the usual process for manufacture of fibrous reinforced thermoset resin laminates using the prepreg technique. The polymerizable liquid, i.e. monomer such as diallyl orthophthalate and the like, polyphenylene ether polymer, catalyst and where desired an allylic prepolymer and modifying ingredients such as dyes, pigments, fillers, glass coupling agents, inhibitors and so forth are mixed together and used to impregnate a fibrous nonwoven mat or a woven fabric; where glass mats or fabrics are used it may be desirable to have the glass treated with a glass coupling agent. The use of some solvent is usually required in order to reduce the viscosity level of the resin composition to make it suitable for application to the mat or fabric with conventional commercial saturating or impregnating equipment.

A typical slow cure is effected by placing a prepreg laminate in a vacuum bag and applying a vacuum of 28 to 29.5 inches of mercury for about 5 hours to remove bubbles; the evacuated lay-up is then pressed at 30 to 50 p.s.i. for 30 minutes at 82° C., 60 minutes at 104° C., 30 minutes at 141° C., 15 minutes at 149° C., and then cured an additional 60 minutes at 149° C. in a laminating press under contact pressure. Thin sections can be cured more rapidly; for example, 30 to 50 p.s.i. for 60 minutes at 149° C. The amount of glass in the lay-up can be as high as 80% and the preferred amount of reinforcing glass is 50 to 75%.

In the compositions of this invention when polyphenylene ethers are used it is not necessary to dissolve the polyphenylene ether resin. Simple uniform dispersion of the polyphenylene ether resin powder in the solvent monomer-polymerizable resin mixtures suffices. Prepregs are generally most economically processed with 30 to 60 parts of the resin composition dispersed in 70 to 40 parts of a suitable solvent such as acetone, methylethyl ketone, methyl isobutyl ketone, toluene, hexylene, chloroform, methylene chloride, trichlorethylene, perchlorethylene and mixtures thereof and other solvents known in the trade to be useful in preparing allylic prepregs.

The mat or fabric is impregnated with the solvent solution and then dried to remove the solvent, preferably continuously in a heated drying tower. After impregnation and drying of the impregnated fabric the laminate is laid up and cured with heat and mild pressure using cure cycles and conditions similar to those used in curing the wet lay-up type laminates. Roving, including glass roving, is similarly pre-impregnated for processing by filament winding techniques into pipe, other cylindrical shapes and hollow tapered and conical shapes. Products made by filament winding are generally cured at about 150° C. in 60 minutes. The fiber content of the prepreg laminates varies from about 15 to about 40° by weight for low density fibers and up to about 55 to 75% of the total weight of the cured laminates for glass mat or glass fabric laminates. The fiber content of filament wound constructions such as pipe, when made from impregnated glass roving, is generally about 70 to 80% of the total weight of the cured product.

Reinforced laminates of fibrous materials such as glass cloth, glass mats, synthetic fiber, cloth mats, paper and the like can be copper-clad to produce copper-clad laminates with excellent electrical properties to be used in preparing printed circuits and the like. The copper-clad laminates are prepared by coating copper foil with a polyphenylene ether resin coating and then baking the coated copper foil at 160° C. for about 15 minutes. The baked resin-coated foil is then placed on resin impregnated fibrous materials such as glass cloth which has been impregnated with the novel resin compositions of this invention which contain at least about 10% or more polyphenylene ether resin and then the "laminate" is pressed at 50 to 2,000 p.s.i. at 100 to 170° C. for at least 5 minutes to convert the resinous materials to the thermoset state. As indicated above dicumyl peroxide is the preferred catalyst for producing the copperclad laminates of this invention. The resulting copper-clad laminates has excellent adhesion of the copper to the base material which has excellent electrical properties. Quite surprisingly when tested according to NEMA Standards Publication Li–1–1966, but at up to 200° C. rather than the 25° C. standard, these copper-clad laminates retained essentially all of their electrical properties as measured at room temperature.

The compositions of this invention can be dissolved in suitable solvents to form coating solutions. These solutions may be applied to substrates such as metal, plastics and wood; dried and cured at about 300° F. to give clear surface films with excellent adhesion, toughness and high heat and chemical resistance.

The following examples, illustrating the novel products disclosed herein, are given without any intention that the invention be limited thereto. All parts and percentages are by weight. The following ASTM Tests were used in evaluating the samples:

A. Flexural Strength _____ ASTM D–790
B. Modulus of Elasticity _____ ASTM D–790
C. Tensile Strength _____ ASTM D–638
D. Izod Impact _____ ASTM D–256
E. Compressive Strength _____ ASTM D–695
F. Deflection Temperature _____ ASTM D–648
G. Water Absorption _____ ASTM D–570(a)
H. Specific Gravity _____ ASTM D–792
I. Dielectric _____ ASTM D–150
J. Dissipation Factor _____ ASTM D–150
K. Volume and Surface Resistivity __ ASTM D–257
L. Flame Resistance _____ ASTM D–229
M. Hardness _____ ASTM D–785

Example 1

A glass cloth laminate was prepared as follows: a mixture of 500 parts of polyphenylene ether polymer (poly- phenylene ether polymer—Type 631–111, General Electric Company) and 500 parts of diallyl isophthalate prepolymer were ball-milled together overnight to facilitate dispersion of part of the mixture in the following saturating solution: Three hundred parts of the ball-milled mixture was added to a solution containing 400 parts of diallyl isophthalate prepolymer, 300 parts of diallyl isophthalate monomer, 30 parts of dicumyl peroxide catalyst, 8 parts of anthracene, 10 parts of gamma methacryloxypropyltrimethoxysilane and 1700 parts of acetone, with vigorous agitation for 30 minutes. Woven glass cloth type 181, was impregnated with this dispersion and dried in a continuous drying tower in the presence of air at 250° F. for two minutes. A second lot of woven glass cloth was impregnated with this dispersion and allowed to dry over 40 hours in air at room temperature.

From each lot of the dried glass cloth were cut 12" x 12" squares, and these squares were stacked 13 plies deep with the warp yarns parallel. These lay-ups were laminated in a flat bed press for 30 minutes at 80° C. at contact pressure, 30 minutes at 120° C. at 300 p.s.i., and 1 hour at 160° C. at 300 p.s.i. The air dried sample was labeled Comparison Example 1. Another impregnating dispersion identical to the above dispersion but containing no anthracene was prepared. A third lot of glass cloth was impregnated with this solution and dried in a continuous drier in the presence of air at 250° F. for two minutes. This sample, labeled Comparison Example 2 contained voids and was structurally too weak to be evaluated. The physical and electrical properties of the example of the invention and Comparison Example 1 are set forth in Table I.

Examples 2 and 3

A series of samples containing diallyl orthophthalate or diallyl isophthalate prepolymers, a corresponding allylic monomer, in some examples a polyphenylene ether polymer, a catalyst, regulated with anthracene and in some examples inhibited with hydroquinone were evaluated for consistency or viscosity change under thermosetting conditions in a torque rheometer. The torque rheometer used was a Brabender Plasticorder manufactured by C. W. Brabender Instruments, Inc., Hackensack, New Jersey, U.S.A., using a 60 gram sample in a number 6 head at 33⅓ r.p.m. at 140° C. The instrument records consistency versus time in meter-gram units.

The following samples were prepared by blending together all ingredients except catalyst and charging them into the mixing head of the Plasticorder. When thoroughly fluxed as indicated by stabilizing of the consistency, catalyst is added and time is designated as zero. Consistency change is then observed at 140° C. up to the limit of the instrument or until the sample is converted to a crumbly gel.

The recorded consistency change for each sample is shown in FIG. 1.

| Formulation | Comparison | | Example | |
|---|---|---|---|---|
| | A | B | 2 | 3 |
| Diallyl orthophthalate prepolymer, grams | 21.0 | 21.0 | 21.0 | 21.0 |
| Polyphenylene ether, grams | 16.0 | 16.0 | 16.0 | 16.0 |
| Aluminum trihydrate, grams | 8.0 | 8.0 | 8.0 | 8.0 |
| Diallyl orthophthalate monomer, grams | 15.0 | 15.0 | 15.0 | 15.0 |
| Dicumyl peroxide, grams | 1.5 | 1.5 | 1.5 | 1.5 |
| Hydroquinone, parts per million | 0.0 | 100.0 | 0.0 | 100.0 |
| Anthracene, percent by weight | 0.0 | 0.0 | 0.5 | 0.5 |

FIG. 1 clearly shows only a very slight induction period before the Comparison A begins to thermoset and the substantially increased induction period of Comparison B which contains 100 p.p.m. hydroquinone. The slopes of the consistency curves A and B in FIG. 1 are the same. Example 2 consistency curve shows that the presence of 0.5% anthracene by weight, based on resins, changes the slope of the time-consistency curve, i.e., changes the rate of the thermosetting or polymerization reaction. Since there is essentially no increased induction period, but a regulated or changed cure rate, the consistency curve of the regulated sample starts to increase in a predictable manner which can be observed by consulting the comparison curves A and B. Because of the cure regulating effect of anthracene curve 2 intersects curve B.

The consistency curve of Example 3, since it is both regulated and inhibited, shows an induction period due to the hydroquinone and a regulated consistency curve due to the anthracene. Before the point where curve 3 went off the chart, beyond the scale of the instrument, Curve 2 and Curve 3 had somewhat similar slopes. The consistency curves in FIG. 1 show that the diallyl orthophthalate polymerization rate can be regulated by anthracine and that anthracene can be used in combination with hydroquinone to both inhibit the onset of polymerization and regulate the polymerization rate.

Examples 4 and 5

The following samples were evaluated as described in Examples 2 and 3 above, the only differences being diallyl isophthalate prepolymer and monomer were used and more anthracene was used to regulate the polymerization rate.

| Formulation | Comparison | | Example | |
|---|---|---|---|---|
| | C | D | 4 | 5 |
| Diallyl isophthalate prepolymer, grams | 21.0 | 21.0 | 21.0 | 21.0 |
| Diallyl isophthalate monomer, grams | 15.0 | 15.0 | 15.0 | 15.0 |
| Polyphenylene ether polymer, grams | 16.0 | 16.0 | 16.0 | 16.0 |
| Aluminum trihydrate, grams | 8.0 | 8.0 | 8.0 | 8.0 |
| Dicumyl peroxide, grams | 1.5 | 1.5 | 1.5 | 1.5 |
| Hydroquinone, parts per million | 0.0 | 100.0 | 0.0 | 100.0 |
| Anthracene, percent by weight | 0.0 | 0.0 | 1.0 | 1.0 |

Figure 2:
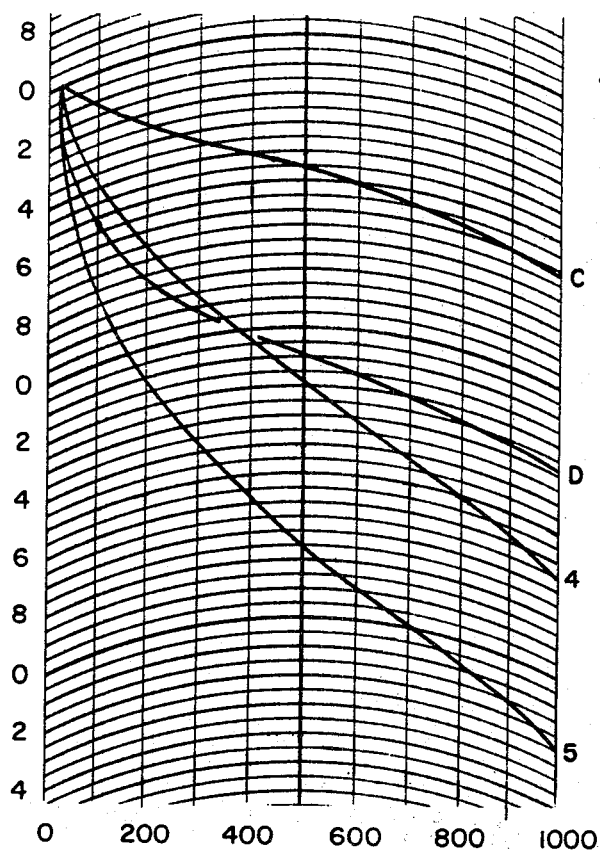
Figure 3:
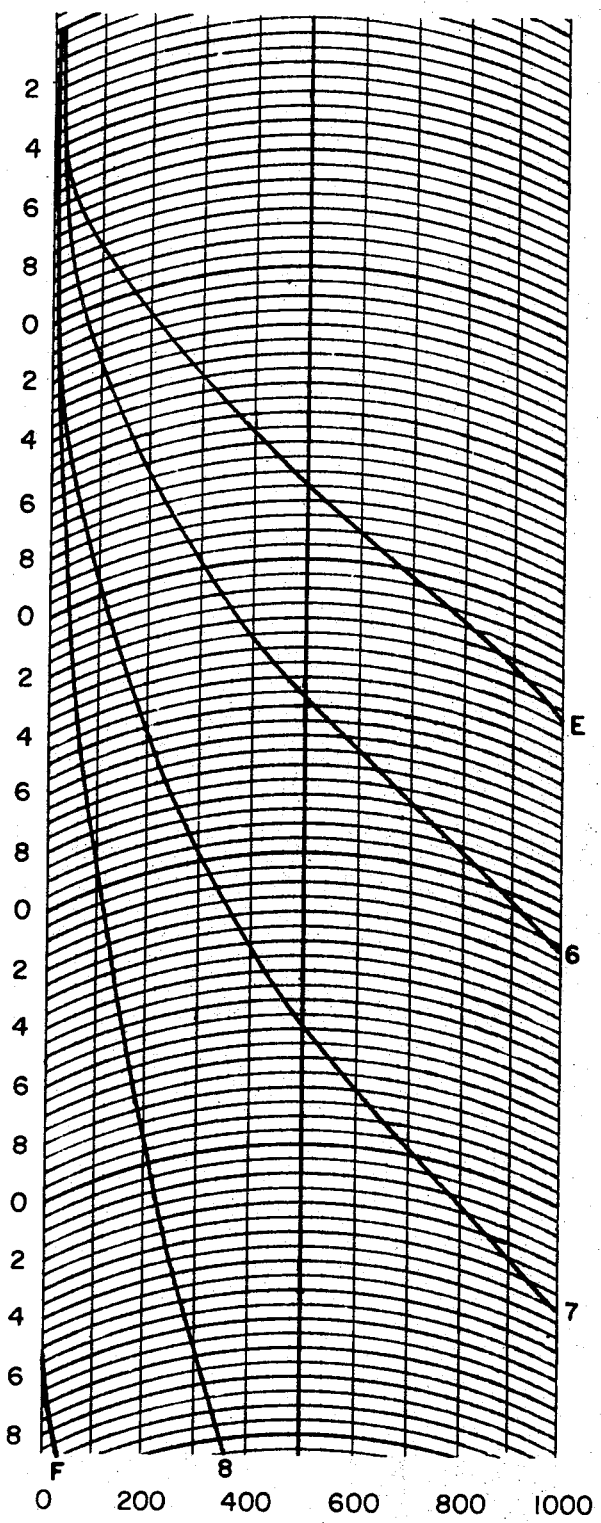

Consistency curves of these formulations determined in the Brabender Plasticorder are shown in FIG. 2. Comparison of the consistency curves C and D show the inhibition effect of hydroquinone (D). The cure rate slopes are the same once the effect of the hydroquinone is overcome. Consistency curve 4 shows the cure rate regulating effect of anthracene as evidenced by the slope of this curve; obviously the sample is simply curing at a slower but steady rate. Consistency curve 5 shows the inhibition effect or induction period caused by the hydroquinone and the changed cure rate caused by anthracene. Comparison of the slope of curve 4 with the slope of curve 5 clearly shows the rate regulating effect of anthracene.

Examples 6, 7 and 8

The following series of examples show that the effect of anthracene in regulating diallyl phthalate polymerization is quantitative. The samples were evaluated as described in Example 2 and 3.

| Formulation | Comparison | | Example | | |
|---|---|---|---|---|---|
| | E | F | 6 | 7 | 8 |
| Diallyl orthophthalate prepolymer, grams | 45 | 45 | 45 | 45 | 45 |
| Diallyl orthophthalate monomer, grams | 15 | 15 | 15 | 15 | 15 |
| Tertiary butyl perbenzoate, grams | 0.6 | 0.6 | 0.6 | 0.6 | 0.6 |
| Anthracene, p.p.m. | 0.0 | 0.0 | 100 | 300 | 600 |
| Hydroquinone, p.p.m. | 0.0 | 100 | 0.0 | 0.0 | 0.0 |

The consistency curves of Comparison E and Examples E and Examples 6, 7 and 8 show that increasing amounts of anthacene increasingly change the rate of polymerization of diallyl orthophthalate. With only 0.6 parts of tertiary butyl perbenzoate catalyst 100 p.p.m. hydroquinone lengthened the inhibition or induction period so much that the consistency did not increase enough to record on the chart even after fifty minutes at 121° C.

TABLE I

| | Example 1 | Comparison Example 1 |
|---|---|---|
| Flexural strength (p.s.i. at 25° C.) | 74,200 | 72,150 |
| Flexural strength (p.s.i. at 260° C.) | 24,280 | 21,570 |
| Flexural modulus (p.s.i. at 25° C.) | 2.60×10⁶ | 2.67×10⁶ |
| Flexural modulus (p.s.i. at 260° C.) | 1.82×10⁶ | 1.86×10⁶ |
| Tensile strength (p.s.i. at 25° C.) | 53,500 | 52,390 |
| Compressive strength (p.s.i. at 25° C.) | 47,200 | 43,400 |
| Dielectric constant, 25° C.: | | |
| 10³ cps., dry | 4.23 | 4.27 |
| 10³ cps., wet | 4.28 | 4.32 |
| 10⁶ cps., dry | 4.20 | 4.22 |
| 10⁶ cps., wet | 4.24 | 4.26 |
| Dissipation factor, 25° C.: | | |
| 10³ cps., dry | 0.0068 | 0.0069 |
| 10³ cps., wet | 0.0071 | 0.0071 |
| 10⁶ cps., dry | 0.0068 | 0.0067 |
| 10⁶ cps., wet | 0.0069 | 0.0069 |
| Percent resin, ⅛″ laminate | 40.1 | 39.8 |

As will be apparent to those skilled in the art, numerous modifications and variations of the processes and products illustrated above may be made without departing from the spirit of the invention or the scope of the following claims.

What is claimed is:

1. A thermosetting diallylic phthalate prepolymer composition comprising (a) a diallylic phthalate prepolymer selected from the group consisting of diallyl orthophthalate prepolymers and diallyl isophthalate prepolymers, (b) 0.01 to 1.5% anthracene, by weight based on the weight of the diallylic phthalate prepolymer, and (c) a peroxide catalyst in sufficient amount to convert the diallylic phthalate prepolymer to the thermoset state at elevated temperatures.

2. A thermosetting composition of claim 1 further consisting of up to 200 parts by weight of filler per 100 parts by weight of diallylic phthalate prepolymer.

3. The thermosetting resin of claim 1, said prepolymer being diallyl orthophthalate, further comprising 1 to 15% by weight of diallyl orthophthalate monomer, based on the weight of the prepolymer.

4. The thermosetting resin composition of claim 1, said prepolymer being diallyl isophthalate, further comprising 1 to 15% by weight of diallyl isophthalate monomer, based on the weight of the prepolymer.

References Cited

UNITED STATES PATENTS

| 3,445,312 | 5/1969 | Rider | 156—332 |
| 3,579,484 | 5/1971 | Thomas | 260—78.4 |
| 3,385,836 | 5/1968 | Mednick | 260—78.4 |

OTHER REFERENCES

Kinetics of Radical Polymerization, XV, Tamara et al., Chem. Abstracts, vol. 65, 1966, p. 5534g.

Peculiarities of Inhibition of Chain-Radical Polymerization of Methyl Methacrylate by Anthracene, Smirnova et al., Chem. Abstracts, vol. 6, 1967, p. 38262n.

JOSEPH L. SCHOFER, Primary Examiner

J. KIGHT III, Assistant Examiner

U.S. Cl. X.R.

260—9, 41 R, A, B, C, AG, 78.5 UA, 874